C. W. GRIFFIN.
ADJUSTABLE BEARING.
APPLICATION FILED MAR. 8, 1917.
1,239,266.
Patented Sept. 4, 1917.
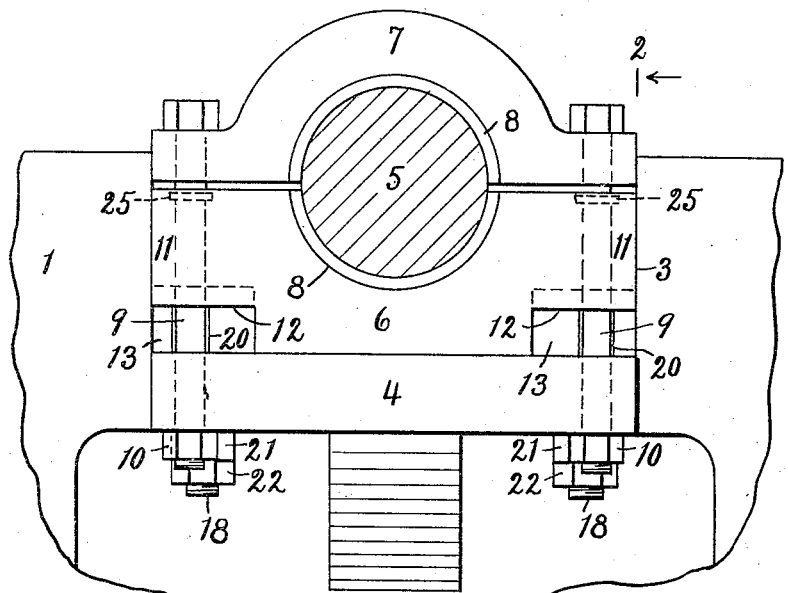
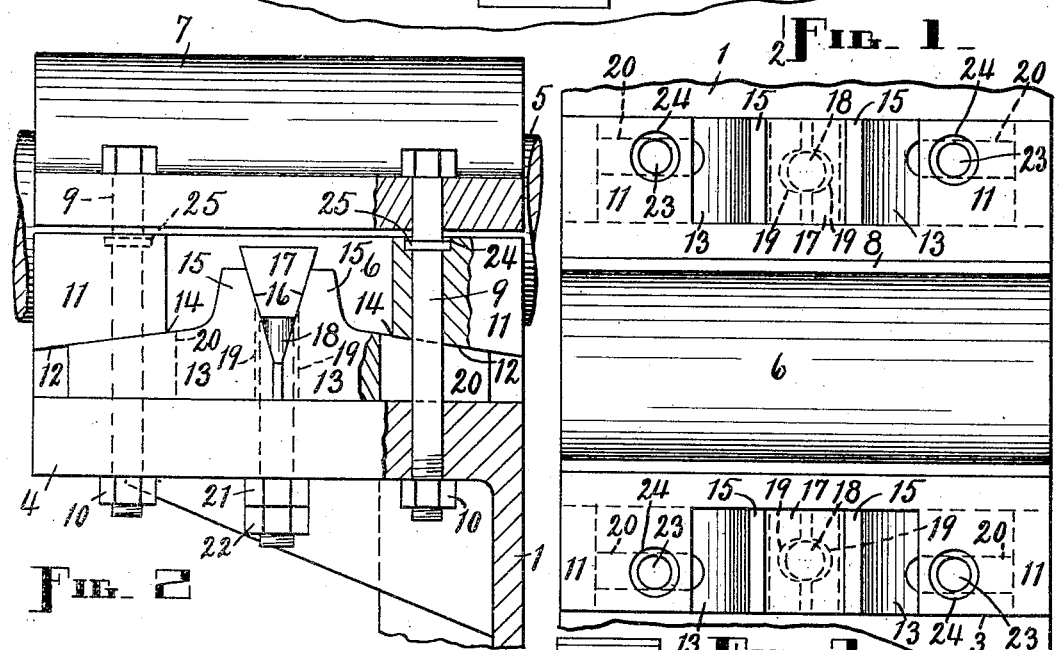
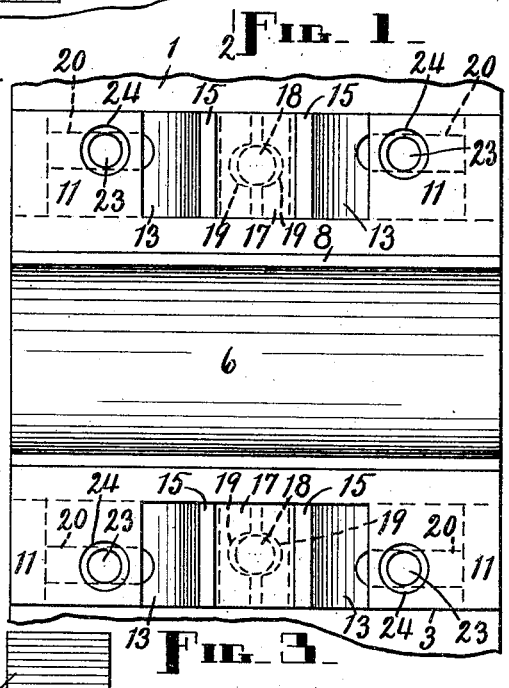
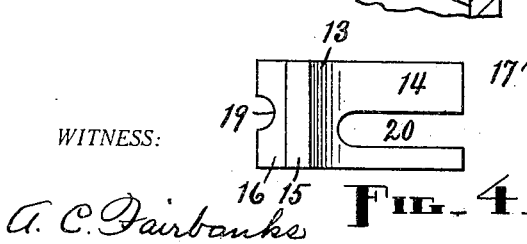
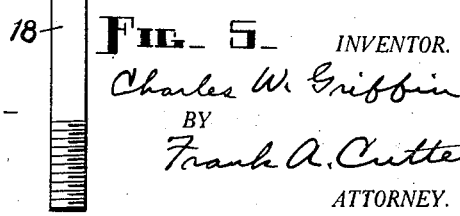
WITNESS:
A. C. Fairbanks
INVENTOR.
Charles W. Griffin,
BY
Frank A. Cutter,
ATTORNEY.

UNITED STATES PATENT OFFICE.

CHARLES W. GRIFFIN, OF RIEGELSVILLE, NEW JERSEY, ASSIGNOR TO TAYLOR, STILES & COMPANY, OF RIEGELSVILLE, NEW JERSEY, A CORPORATION OF NEW JERSEY.

ADJUSTABLE BEARING.

1,239,266.  Specification of Letters Patent.  Patented Sept. 4, 1917.

Application filed March 8, 1917. Serial No. 153,433.

*To all whom it may concern:*

Be it known that I, CHARLES W. GRIFFIN, a citizen of the United States of America, residing at Riegelsville, in the county of Warren and State of New Jersey, have invented a new and useful Adjustable Bearing, of which the following is a specification.

My invention relates to improvements in journals or bearings for shafts, and to means for adjusting the same, and consists essentially of a specially constructed journal or bearing box for a shaft, adjusting wedges of peculiar design for said box, and spreaders, that is, bolts having wedge-shaped spreader heads, for said adjusting wedges, together with a suitable support, as the supporting part of a machine, and such other parts and members as may be necessary or desirable to complete the bearing, all as hereinafter set forth.

The primary object of my invention is to produce a strong and durable bearing for shafts, whereby the same can be easily and quickly adjusted without raising from such bearing the shaft journaled therein, a saving being thus effected in time, labor and expense.

A further object is to provide such a bearing which, though simple in construction and in the manner of adjustment, is capable of withstanding the severest strain, being practically as stable, even under the extreme stress incident to excessive pound and vibration, as a bearing that is integral with the frame of a machine or equivalent support.

Still another object is to provide in such bearing adjustable means which are both positive and susceptible of very close or fine adjustment. With the aforesaid adjustable means it is practicable to adjust the bearing to one-thousandth of an inch and even less.

Other objects and advantages will appear in the course of the following description.

I attain the objects and secure the advantages of my invention by the means illustrated in the accompanying drawings, in which—

Figure 1 is an end elevation of a bearing which embodies a practical form of my invention; Fig. 2, a partial section and side elevation of said bearing, taken on lines 2—2, looking in the direction of the associated arrow, in Fig. 1; Fig. 3, a top plan of the bearing, without the cap and collar-bolts and without the section of shaft shown in the preceding views; Fig. 4, a top plan of one of the adjusting wedges detached, and, Fig. 5, a side elevation of one of the spreader bolts.

Similar reference characters refer to similar parts throughout the several views.

A fixed or rigid supporting member or support is required as an important element or essential part of my bearing. Such support is usually an integral part of the frame of a machine with which the bearing is incorporated to serve in the capacity of a journal for a shaft of such machine. When the bearing is used for a shaft that is not directly a part of any machine, the aforesaid support may and generally will be a separate and independent element, like a shaft hanger or bracket. In either event the nature of the invention is not affected. I have here shown a support which consists of a fragmentary portion of a machine frame 1, which is recessed at 3, and has a horizontal ledge, shelf, or bracket 4 extending therefrom at the bottom of the recess.

A section of a shaft is represented at 5, and this is journaled in a box 6 having a cap 7, with the usual intervening Babbitt-metal lining 8. The box 6 with its cover 7 are receivable in the recess 3, and said box rests directly on the bracket 4, as best shown in Fig. 1, unless raised off of said bracket by the means presently to be described. Ordinary collar-bolts 9 with nuts 10 may be employed to secure the cap 7 to the box 6 and both in place in the recess 3 on top of the bracket 4, such bolts passing down through said cap, said box or lugs 11 with which the same is provided, and said bracket, and said nuts being screwed on to the lower terminals of said bolts under said bracket.

There are four wings or lugs 11 and they extend laterally from the body portion of the box 6 and have beveled bottoms 12. The bottom 12 of each lug 11 is beveled or inclined in a direction which is parallel with the longitudinal center of the main or direct shaft-supporting portion, that is, the body of the box 6, and such bottom inclines upwardly and inwardly from the outer end of such lug, which end is flush with the adjacent or contiguous end of said box body. It is now plainly to be seen that, if wedges be inserted between the bracket 4 and the lugs 11 and such wedges be forced outwardly on toward the outer ends of said lugs, the latter will be raised and will elevate with them the entire box 6 and its load.

Four adjustable wedges or wedge-blocks 13 are provided to rest on the top of the bracket 4 and extend beneath the lugs 11. These wedge-blocks 13 are flat on the bottom, have tapered or inclined top surfaces 14 to conform to and contact with the inclined bottoms 12 of the lugs 11, and are provided with upstanding projections 15. There is a projection 15 on one end of each wedge-block 13, the end of such block opposite to such projection being the "thin edge of the wedge." The wedge-blocks 13 are arranged in pairs each side of that part of the box 6 that extends between the lugs 11, and between such part and the sides of the recess 3, with the ends of such blocks in each pair, where are located the projections 15, in adjacency. Adjacent faces of the projections 15 in each pair are beveled or inclined as at 16, in order to provide a V-shaped opening between, when the wedge-blocks 13 are in place, for a V-shaped member 17, the latter constituting the head of a bolt 18, of which there are two. The adjacent ends of the wedge-blocks 13 in each pair are also channeled vertically, below the beveled faces 16 of the projections 15 on such blocks, as represented at 19, to accommodate the shanks of the bolts 18. The beveled part of each wedge-block 13 is longitudinally slotted at 20 to enable said block to clear the adjacent collar-bolt 9 and to slide outwardly and inwardly without interference from said bolt.

The bolts 18 broadly considered are the spreaders for the adjusting wedges or wedge-blocks 13, and such bolts have at the top the wedge-shaped heads 17 to fit between and engage the contiguous beveled faces of the two pairs of projections 15, while the shanks of such bolts extend downward between the adjacent ends of the wedge-blocks in the two pairs and in the channels 19, and through the bracket 4. Nuts 21 and set-nuts 22 are screwed on to the protruding terminals of the spreader bolts 18, beneath the bracket 4.

There is a vertical passage 23 through each lug 11, for one of the collar-bolts 9, with an annular seat 24 at the top, for the collar 25 on such bolt.

In practice, assuming that the parts are assembled in the manner herein shown and described, when it is desired to raise the shaft 5 by elevating the box 6, the collar-bolt nuts 10 are first loosened, and then the bolts 18 are drawn down by screwing up the nuts 21 and 22 thereon, with the result that the spreader heads 17 force the projections 15 farther apart and so project the wedge-blocks 13 outwardly, beneath the lugs 11, and said wedge-blocks elevate said box. After the required adjustment has been made, the nuts 10 are retightened.

The box 6 is held down securely, either on the bracket 4 or on the wedge-blocks 13 as the case may be, by means of the collar-bolts 9 and the nuts 10, the collars 25 bearing from above on the seats 24 in the lugs 11, and said nuts bearing from below on said bracket.

In the event the box 6 be located by the wedge-blocks 13 at too high an elevation, said box is lowered by loosening the nuts 21 and 22, to permit the bolts 18 to rise, tightening the nuts 10 and subsequently said nuts 21 and 22 also, provided the latter operation be necessary. The wedge-blocks 13 may be tapped at their outer ends to drive them inwardly, and the bolts 18 may be elevated from below, while adjusting the box 6 downwardly.

In the drawings the box 6 is represented as resting directly on the bracket 4 and so in its lowest or initial position, but in practice said box will as a rule, of course, rest on the wedge-blocks 13.

Various modifications and changes in the shape, size, arrangement, and construction of some or all of the parts of this device, in addition to those of which mention has hereinbefore been made, may be resorted to without departing from the spirit of my invention.

What I claim as my invention, and desire to secure by Letters Patent, is—

1. The combination, in an adjustable bearing, with a support, of a box having underneath inclined bearing surfaces arranged in pairs on opposite sides of the longitudinal central vertical plane of said box, wedge-blocks interposed between said surfaces and said support, said wedge-blocks being parallel with said plane, bolts having spreader heads which are interposed between said wedge-blocks, there being such a head between the wedge-blocks in each pair, and the shank of each of said bolts passing between the wedge-blocks in each pair and through said support, and nuts on the protruding terminals of said bolts.

2. The combination, in an adjustable bearing, with a support, of a box provided with laterally extending lugs arranged in pairs, slotted wedge-blocks interposed between said lugs and said support, bolts having spreader heads which are interposed between said wedge-blocks, there being such a head between the wedge-blocks in each pair, and the shank of each of said bolts passing between the wedge-blocks in each pair and through said support, bolts passing through said lugs, the slots in said wedge-blocks, and said support, and nuts on the protruding terminals of all of said bolts.

3. The combination, in an adjustable bearing, with a support, of a box having wedge-block-contacting surfaces, slotted wedge-blocks interposed between said surfaces and said support, spreaders between said wedge-blocks, said spreaders, when actuated in one direction, being adapted to actuate said wedge-blocks and cause them to elevate said box, bolts passing through the parts of said box that form said wedge-block-contacting surfaces, through the slots in said wedge-blocks, and through said support, and nuts on the protruding terminals of said bolts.

4. The combination, in an adjustable bearing, with a support, of a box provided with laterally-extending lugs having underneath inclined bearing surfaces, said lugs being arranged in pairs, wedge-blocks interposed between said lugs and said support, such wedge-blocks in each pair having, at their adjacent terminals, upwardly-extending projections the inner faces of which are beveled, bolts provided with spreader heads which are interposed between said projections, there being such a head to contact with each pair of said beveled faces, and the shank of each of said bolts passing between the wedge-blocks in each pair and through said support, and nuts on the protruding terminals of said bolts.

5. The combination, in an adjustable bearing, with a support, of a box provided with laterally-extending lugs having underneath inclined bearing surfaces, said lugs being arranged in pairs, slotted wedge-blocks interposed between said lugs and said support, such wedge-blocks in each pair having, at their adjacent terminals, upwardly-extending projections the inner faces of which are beveled, bolts provided with spreader heads which are interposed between said projections, there being such a head to contact with each pair of said beveled faces, and the shank of each of said bolts passing between the wedge-blocks in each pair and through said support, bolts passing through said lugs, the slots in said wedge-blocks, and said support, and nuts on the protruding terminals of all of said bolts.

CHAS. W. GRIFFIN.

Witnesses:
EDWARD H. APGAR,
WARREN BROTZMAN.

Copies of this patent may be obtained for five cents each, by addressing the "Commissioner of Patents, Washington, D. C."